Figure 1:
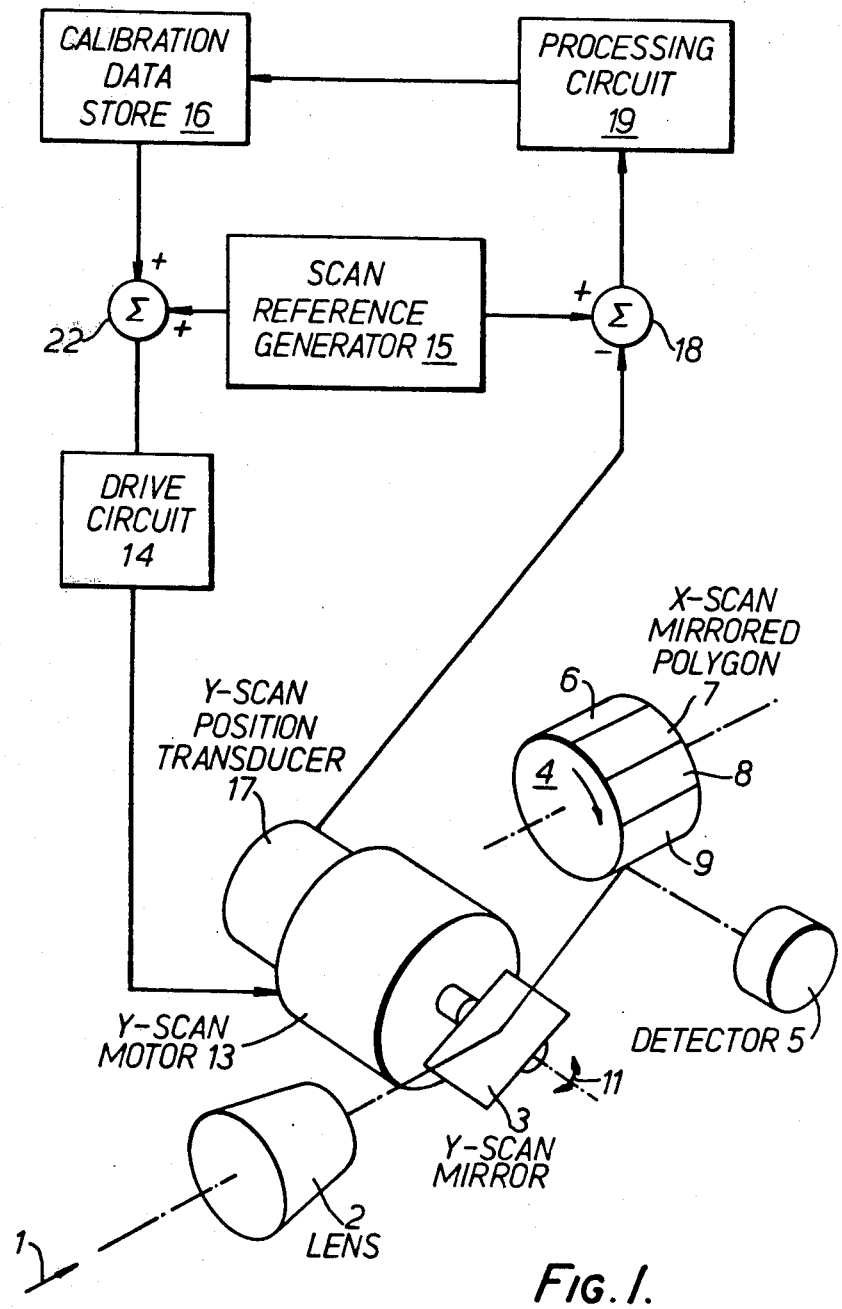

United States Patent [19] [11] 4,439,715
Taylor [45] Mar. 27, 1984

[54] APPARATUS FOR ACCURATELY MOVING A BODY IN ACCORDANCE WITH A PREDETERMINED MOTION

[75] Inventor: Malcolm F. Taylor, Chelmsford, England

[73] Assignee: The Marconi Company Limited, Chelmsford, England

[21] Appl. No.: 320,685

[22] Filed: Nov. 12, 1981

[30] Foreign Application Priority Data

Nov. 19, 1980 [GB] United Kingdom ............... 8037069

[51] Int. Cl.³ .............................................. G05B 11/01
[52] U.S. Cl. .................................... 318/627; 318/467
[58] Field of Search ............... 310/282, 626, 627, 467

[56] References Cited

U.S. PATENT DOCUMENTS 3,665,282  5/1972  Skehan ................................ 318/627
3,831,076  8/1974  Burke et al. ......................... 318/627
3,852,651 12/1974  Dufendach .......................... 318/627
3,995,207 11/1976  Way ................................ 318/627 X
4,132,939  1/1979  Kameyama et al. ................. 318/627

Primary Examiner—B. Dobeck
Attorney, Agent, or Firm—Spencer & Frank

[57] ABSTRACT

An apparatus is provided for accurately moving a body in accordance with a predetermined motion. An embodiment of the invention relates to an optical scanning system in which the movement of an intermittently tilting mirror is required to be extremely linear. The positions of the mirror at predetermined points are compared with the required positions and correction signals generated for use on subsequent movement cycles. Because of the high speed of movement of the mirror, it is preferred to make only one comparison per movement cycle and it may be necessary for a number of comparisons to be made for any one predetermined point until a satisfactory correction is achieved.

8 Claims, 3 Drawing Figures

APPARATUS FOR ACCURATELY MOVING A BODY IN ACCORDANCE WITH A PREDETERMINED MOTION

This invention relates to apparatus for accurately moving a body in accordance with a predetermined motion. The invention is particularly applicable to the rapid and repetitive movement of bodies in which a very high degree of accuracy is required. Such a requirement can arise, for example, in optical scanning systems in which two movable mirrors co-operate to scan a light beam in a two dimensional pattern. A typical two dimensional pattern of this kind corresponds to a conventional television raster pattern. As is known, a two dimensional pattern of this kind can be produced by means of a continuously rotating polygonal mirror, which produces the "line" or horizontal scan motion of the raster pattern, and a reciprocating tilting mirror which produces the "field" or vertical scan motion. The movement of the mirrors with time must be accurately controlled in order to avoid introducing distortions into the two dimensional pattern. Whilst it is relatively simple to precisely control the movement of the continuously rotating mirror by conventional feedback techniques, it is, however, extremely difficult to satisfactorily control the motion of the other mirror which undergoes rapid intermittent movement. The present invention seeks to provide an improved apparatus for moving a body in accordance with a predetermined motion.

According to this invention, an apparatus for accurately moving a body in accordance with a predetermined motion includes an actuator capable of being coupled to a movable body so as to move it in a controlled manner repetitively in at least approximately the required motion; means for comparing the actual position of the body with the required position at a plurality of different points during the course of a plurality of the repetitive predetermined motions, with substantially less than the total number of comparisons being performed during any one of the motions; and means which utilise the results of said comparisons to control said actuator to compensate during subsequent motions for said errors.

Typically, only one comparison will be made during any one of the predetermined motions. When the motion is to be checked over a large number of individual points, it will clearly take a corresponding number of the motions to check each point. In practice, it may take a significant number of repeated comparisons to reduce to an acceptable level the error associated with each point.

Figure 2:
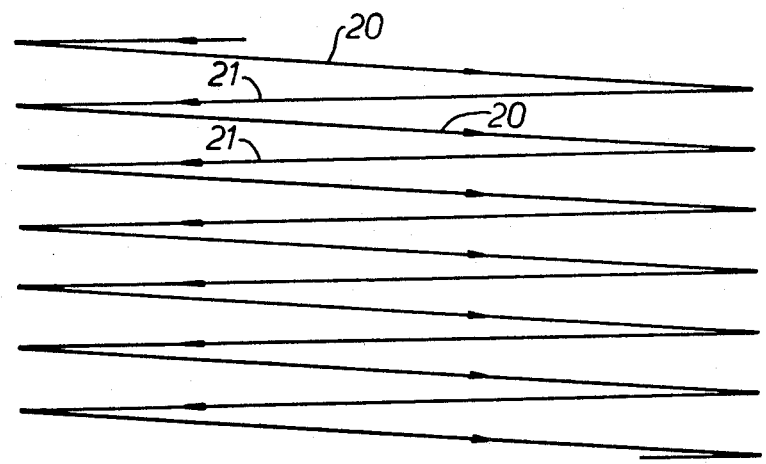
Figure 3:
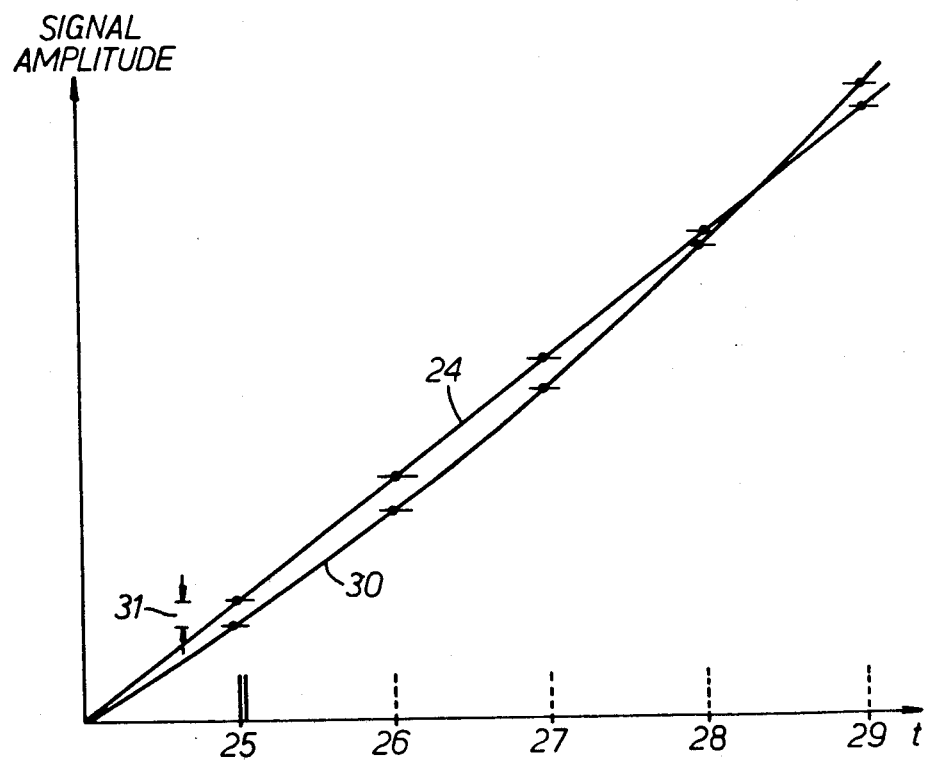

The invention is further described by way of example with reference to the accompanying drawings in which, FIG. 1 shows an optical scanning system in accordance with the present invention, FIG. 2 shows a typical two dimensional optical pattern and FIG. 3 is an explanatory diagram relating to the operation of the system.

Referring to the drawings, an optical scanning system is provided for scanning a two dimensional field of view in a line raster pattern, and for presenting in turn each scanned element of the field of view to a detector. A requirement for such an optical scanning system can arise in connection with infra-red imaging systems in which the thermal content of each element in a viewed scene is presented to an infra-red detector in turn, so that a serial signal is generated which is representative of the scene and which can be utilised subsequently as required. A very similar optical scanning system can be used to cause a point source of light, such as a laser beam, to scan a two dimensional picture area. In each case, a suitable scanning pattern is similar to a conventional television raster pattern of the kind shown in FIG. 2. This pattern consists of a number of parallel line scans 20 followed by rapid almost instantaneous flyback intervals 21. The way in which a scanning pattern of this kind is generated is explained with reference to FIG. 1.

Referring more particularly to FIG. 1, incoming light from a two dimensional field of view is represented by the arrow 1 and is projected via a lens 2 and two mirrors 3 and 4 on to an optical detector 5. The mirror 4 is a continuously rotating polygon having a number of flat reflecting surfaces of which only four surfaces 6, 7, 8 and 9 are visible in FIG. 1. The other mirror 3 is a reciprocating tilting mirror, which oscillates about the axis 11 in the direction of the double headed arrow as shown. The action of the continuously rotating mirror 4 is to produce a deflection in the line scan direction 20. When the limit of deflection provided by one of the flat surfaces of the mirror 4 is reached, this corresponds to the far end of an individual line scan and the next flat surface of the mirror commences the next line scan. Thus, in effect, the rotating mirror 4 produces an X axis deflection of the optical beam. The tilting mirror 3 produces the necessary Y axis deflection, since otherwise all line scans would be superimposed exactly on top of each other and the scanned pattern would not be two dimensional.

The mirror 3 tilts steadily and continuously in one direction until a Y axis deflection equivalent to the height of the two dimensional optical pattern has been reached. It then immediately and almost instantaneously reverts to its original position and the slow tilting motion repeats. Thus the two mirrors act in combination to produce a raster like scanning pattern shown in FIG. 2.

Any irregularities in the movement of either of the two mirrors will appear as distortions in the raster pattern, and for many applications it is essential that such distortions are kept to an absolute minimum. It is relatively simple to minimise distortions introduced in the X axis direction by ensuring that the mirror 4 rotates continuously at an exactly constant speed. This can be ensured by means of simple conventional feedback circuits. However, the motion of the mirror 3 is not continuous, but intermittent, and the angular tilt which it exhibits at any particular moment is directly related to the magnitude of the energising signal which has been applied to it. Because of the speed at which the mirror 3 moves, it is extremely difficult to apply conventional feedback techniques so as to control its movement and to reduce distortions which are inherently present. In a typical optical scanning application, the mirror 3 is required to oscillate at a rate of fifty times a second.

The mirror 3 is driven by an actuator, which takes the form of a Y scan motor 13. This is controlled via a drive circuit 14 which receives signals from a scan reference generator 15 and a calibration data store 16. The movement of the motor 13 can be determined accurately by means of a position transducer 17, which is carried directly by the moving portion of the motor 13. The output of the transducer 17 is compared with the contents of the scan reference generator at a comparator 18 and the result of the comparison is fed into a processing circuit 19. The transducer itself may be a conventional optical shaft encoder. The accuracy of the position transducer 17 is critical and its accuracy determines the final accuracy with which the motor 13 can move the mirror 3.

The motor 13 may itself be of conventional design and could be of either the magnetically centred or the torsion pair centred type. It is, of course, selected to have a maximum torque capable of driving the mirror 3 and the transducer 17 with the acceleration required by the optical scanning pattern—in practice, this is determined by the time allowed for vertical (Y axis) flyback.

The scan reference generator 15 contains an electrical waveform which represents the Y axis scan pattern required at the scanning mirror 3. The waveform is acceleration limited so that at no time is a demand made to the motor 13 which is beyond its torque capability. Part of a typical waveform is shown in FIG. 3, which represents the movement of the mirror 3 corresponding to the first five line scans.

When the system is first energised, the calibration data store 16 is empty and the motor 13 is driven only by the basic waveform contained within the scan reference generator 15.

Motor performance imperfections and any errors in the drive circuits will be reflected in the output signal provided by the position transducer 17, and in order to identify these the output of the position transducer 17 is compared with that of the reference generator 15 at a subtractor 18. In practice, the subtractor 18 is a scummation device in which the transducer output signal is applied to its negating input. The comparator 18 therefore provides an output if the signal provided by the position transducer 17 differs from that of the scan reference generator 15, and the magnitude and sign of the result of the comparison is representative of the errors. The error signal thus generated is measured at predetermined points of the movement which the mirror 3 undergoes. Only one point is selected for comparison within any one movement cycle and in the first cycle the first predetermined point is selected for comparison.

This process is illustrated in FIG. 3 in which the reference waveform stored by the scan reference generator 15 is illustrated by the straight line 24. This line 24 represents the way in which the drive signal amplitude varies with time. The various possible comparison points are shown at times 25, 26, 27, 28, 29 and in practice, a very large number of such points would be provided. Typically one comparison per line scan is made. However, as mentioned above only one comparison is made during any one cycle and during the first cycle the scan reference waveform 24 is compared at point 25 with the output 30 of the position transducer 17. It will be seen that the two waveforms differ in amplitude by an amount 31 and it is this amount which is fed into the processing circuit 19. For ease of illustration no account has been made of the delay which occurs within the motor 13 before it responds to a drive signal applied to it. In practice, however, the response time of the system is finite and must be allowed for. Within the processing circuit 19 an estimate of the drive signal that would have been needed to drive the motor at a critical time in the past to have result in zero error at the measurement point 25 is then made. The initial correction may be relatively crude and it is stored in the calibration data store 16 and added in synchronism to the scan reference waveform by the summation circuit 22 on the next scan cycle so as to produce a modified signal which drives the motor 13. The measurement, estimation and summation sequence is repeated for the point 25 a number of times until an acceptably small error is obtained from the comparator 18. Following each comparison the data held within the calibration data store 16 is up-dated, as necessary. Once the error is acceptably small for point 25, next point 26 is examined. This is achieved by simply controlling the time at which the outputs of the san reference generator 15 and the position transducer 17 are sampled. Ideally, the duration of the sample time itself should be very small to avoid integrating any errors which are present. This process is repeated for each of the points 25, 26, 27, 28, 29, etc. until finally, the calibration data store contains information that can be added to the entire reference waveform so as to maintain zero error between the drive waveform and the output of the position transducer 17 at all measured points in the scan cycle.

In a typical optical raster pattern, there may be several hundred separate line scans. It is assumed that each line scan contains one comparison point and consequently, several hundred individual comparison points must be processed. The calibration time is therefore appreciable, but in a repetitive scanning system this is unlikely to be a significant drawback.

The calibration process can be repeated continuously during normal operation of the system without adversely interfering with the raster pattern produced. Again, it is desired to sample only one comparison point during each cycle. Because only one comparison point is examined during each cycle, the processing speed is not excessively great, and it is not necessary to use particularly high speed processing circuits. Continuous calibration enables any minor changes in motor performance due, for example, to changes in temperature to be detected at an early stage before serious non-linearities are introduced into the raster pattern. Although in this example it has been estimated that the mirror 3 is moved linearly with time, this is not essential and in other applications, it may be desirable to introduce a known non-linearity into the movement. In this case, it is merely necessary to enter the appropriate non-linear law into the scan reference generator 15 and to subsequently accumulate correction data within the calibration data stored as the motor is calibrated.

If desired, the calibration data store and the scan reference generator could be controlled by a suitable processor of which the processing circuit 19 could form a part. Although the invention has been described with particular reference to an optical scanning system, it is of more general application and could be used to control the motion of any body which undergoes a repetitive movement.

I claim:

1. An apparatus for accurately moving a body in accordance with a predetermined motion including an actuator capable of being coupled to a movable body so as to move it in a controlled manner repetitively in at least approximately the required motion; means for comparing the actual position of the body with the required position at a plurality of different points during the course of a plurality of the repetitive predetermined motions, with substantially less than the total number of comparisons being performed during any one of the motions; and means which utilise the results of said comparisons to control said actuator to compensate during subsequent motions for said errors.

2. An apparatus as claimed in claim 1 and wherein only one of said comparisons are made during any one of the predetermined motions.

3. An apparatus as claimed in claim 1 or 2 and wherein each predetermined point is examined a plurality of times so as to bring its actual position into agreement with its required position before other points occuring subsequently in said movement are examined.

4. An apparatus as claimed in claim 1 or 2 and wherein the predetermined points are determined by the instant in time at which a signal controlling said actuator, and a signal indicative of the actual position of the body are sampled.

5. An apparatus as claimed in claim 1 or 2 and wherein said body is a tilting mirror which is mounted on said actuator and which forms part of an optical scanning system.

6. An apparatus as claimed in claim 5 and wherein a position sensor is coupled to said mirror so as to move with it, and which provides a signal indicative of the actual position of the mirror.

7. An apparatus as claimed in claim 1 or 2 and wherein a reference signal generator is provided for producing the reference signal necessary to drive the actuator, and wherein means are provided for generating a modifying signal for modifying the reference signal as a result of said comparison.

8. An apparatus as claimed in claim 7 and wherein said reference signal and the modifying signal are held in data stores, and are generated in synchronism with each other, and are combined to form a modified reference signal which drives said actuator.

* * * * *